United States Patent [19]

Ando

[11] Patent Number: 5,271,951
[45] Date of Patent: Dec. 21, 1993

[54] POWDERY OYSTER JUICE COMPOSITION, PROCESS FOR THE PRODUCTION OF THE SAME, AND PROCESS FOR RETAINING THE FRESHNESS OF PERISHABLE FOOD WITH THE USE OF POWDERY OYSTER JUICE COMPOSITION

[76] Inventor: Yoshimi Ando, 3-18, Gokiso-Dori, Showa-ku, Nagoya-shi, Aichi-ken, Japan

[21] Appl. No.: 665,516

[22] Filed: Mar. 5, 1991

[30] Foreign Application Priority Data

Nov. 21, 1990 [JP] Japan .................. 2-316460

[51] Int. Cl.$^5$ ............ A23C 21/08; A23L 1/327; A23L 2/08; A23L 3/00
[52] U.S. Cl. ................... 426/655; 426/471; 426/589; 426/590
[58] Field of Search .............. 426/471, 655, 590, 589

[56] References Cited

U.S. PATENT DOCUMENTS

| | | | |
|---|---|---|---|
| 1,876,090 | 9/1932 | Strasburger | 426/589 |
| 3,262,788 | 7/1966 | Swanson et al. | 426/593 |
| 3,634,103 | 1/1972 | Lowe et al. | 426/471 |
| 3,634,128 | 1/1972 | Bolin | 426/330.5 |

FOREIGN PATENT DOCUMENTS 2007489 5/1979 United Kingdom ............. 426/589

*Primary Examiner*—Jeanette Hunter
*Assistant Examiner*—Mary S. Mims
*Attorney, Agent, or Firm*—Lowe, Price, LeBlanc & Becker

[57] ABSTRACT

A powdery oyster juice composition comprises oyster juice and lactose. A process for the production of the powdery oyster juice composition comprises mixing an oyster juice concentrate with lactose and drying the mixture in such a manner as to reduce the moisture content of the mixture to 5% or below. A process for retaining the freshness of a perishable food, for example fish, shellfish, livestock meats and vegetables, comprises contacting the food with the powdery oyster juice composition or an aqueous solution thereof. The powdery oyster juice composition, which is excellent in preservability and handleability, makes it possible to retain the freshness of a refrigerated or cold-stored perishable food on a level comparable to that before refrigeration or cold storage.

15 Claims, No Drawings

POWDERY OYSTER JUICE COMPOSITION, PROCESS FOR THE PRODUCTION OF THE SAME, AND PROCESS FOR RETAINING THE FRESHNESS OF PERISHABLE FOOD WITH THE USE OF POWDERY OYSTER JUICE COMPOSITION

BACKGROUND OF THE INVENTION

1. Field of the Invention

This invention relates to a powdery oyster juice composition, a process for the production of the same, and a process for retaining the freshness of perishable foods for example fish, shellfish, livestock meats and vegetables, with the use of said powdery oyster juice composition.

2. Description of the Prior Art

A common means for retaining the freshness of perishable foods comprises refrigeration or cold storage thereof. In particular, refrigeration is an indispensable means for the prolonged storage of fishes, shellfishes and livestock meats. However there has been provided no effective means for avoiding or preventing the deterioration (for example, drying or oxidation) thereof during storage in a frozen state, though rapid chilling and glazing are effective therefor to some extent. Further, it is unavoidable in thawing frozen foods that the textures of fishes, shellfishes or livestock meats suffer from some changes. Namely, it is very difficult to restore these thawed foods to a state before refrigeration. When vegetables are frozen, the freezing of the moisture contained in their cells causes destruction of their textures, so that most of the frozen vegetables cannot be restored to a state before refrigeration. Therefore vegetables are usually cold-stored. In this case, however, they suffer from some troubles including drying during cold storage thereof.

When perishable foods such as fishes or shellfishes (including prawns and crabs) which have not been heat-treated are rapidly chilled and then thawed, the textures of the foods are weakened as compared with those before chilling, even when they are neither dried nor oxidized. In the case of shucked prawns, for example, an unfrozen fresh prawn is bent just like a hook when hung bottom up. In contrast, a shucked prawn, when frozen and thawed, forms into a stick when hung in the same manner. When picked with fingers, the trunk of an unfrozen fresh prawn is tight and elastic, while the trunk of a frozen and thawed prawn is soft and less elastic. This difference in elasticity between the unfrozen and frozen prawns is clearly noticeable when they are taken uncooked, for example, as sashimi. When roasted directly on fire or on an iron plate, an unfrozen prawn undergoes little shrinkage and is juicy, while a frozen and thawed prawn undergoes serious shrinkage and is not juicy. The above-mentioned differences in elasticity, shrinkage upon roasting and juiciness between the unfrozen and frozen prawns are similarly observed in other fishes and such as the adductor muscle of a scallop, and in livestock meats.

SUMMARY OF THE INVENTION

The present invention has conducted extensive studies on a process for retaining the freshness of perishable foods and unexpectedly has found out that oyster juice is effective in retaining the freshness of perishable foods. Further, he has succeeded in the application of a powdery oyster juice composition, according to the present invention, to the retention of the freshness of perishable foods. Accordingly, the present inventor has succeeded in retaining perishable foods, either frozen and then thawed or cold-stored and then brought to room temperature, in a state substantially the same as that before refrigeration or cold storage, by contacting the foods with a powdery oyster juice composition comprising oyster juice and lactose or an aqueous solution thereof before or/and after refrigeration or cold storage.

DESCRIPTION OF THE PREFERRED EMBODIMENTS

An oyster juice is a drip formed when an oyster in the shell is steamed, and is a by-product obtained in the preparation of dry oysters for Chinese dishes by drying heated oysters. It can be obtained by extracting heated oysters with water and then concentrating the extract. Different from an oyster extract having an intense body, this drip (i.e., oyster juice) has little body and thus has been discarded in most cases.

However the drip (oyster juice) is poor in preservability or handleability as such, and the result of subsequent studies conducted to solve this problem has proved that a powdery oyster juice composition which is excellent in preservability, can be easily handled and which has an effect of retaining the freshness of perishable foods can be obtained by concentrating the drip to thereby give an oyster juice concentrate in the form of a syrup, mixing the concentrate with lactose, and drying.

The powdery oyster juice composition may be prepared in the following manner.

(1) Preparation of Oyster Juice Concentrate

Dry oysters are prepared by steaming oysters in the shell, followed by drying. The drip obtained in this step is filtered, if required, and concentrated to at least 28° Bé to thereby give an oyster juice concentrate. (This concentrate is in the form of a pale brown syrup and contains common salt, glycogen, nitrogen compounds, etc. However it does not have a body so intense as that of so-called oyster extract prepared by heating and extracting oyster meat with water and concentrating the extract.)

(2) Mixing of Oyster Juice Concentrate with Lactose

Lactose is used as a binder for powdering the oyster juice. The lactose may be a commercially available one and either monohydrate or anhydride may be employed. The oyster juice concentrate and lactose are mixed with, for example, a kneader so as to give a moist mixture (powder). Regarding the mixing ratio, it is appropriate to use 0.05 to 0.1 part (by weight, the same will apply hereinafter) of the oyster juice concentrate per part of lactose monohydrate or to use 0.05 to 0.15 part of the oyster juice concentrate per part of lactose anhydride. When the ratio of the oyster juice concentrate to the lactose is smaller than 0.05, the effect of the resulting powdery oyster juice composition of retaining the freshness of perishable foods is deteriorated. When it exceeds 0.1 (in the case of lactose monohydrate) or 0.15 (in the case of lactose anhydride), on the other hand, the resulting mixture of the oyster juice concentrate with lactose becomes sticky, which causes some troubles in the preparation procedure such that the subsequent drying step becomes difficult or that the dried material forms a large and hard mass. A mixture having the mixing ratio as specified above is in the form of a somewhat moist and crispy material which can be easily handled and efficiently dried in the subsequent drying step.

(3) Drying

It is preferable to continue the drying until the moisture content of the mixture is lowered to 5% or below. The drying may be performed by a conventional method such as hot-air drying or lyophilization. It is sometimes observed that a portion of the dried mixture forms a soft mass, which is ground, if required.

In the above process, the mixing (2) and the drying (3) are separately performed. Alternately, the mixing and the drying may be continuously carried out in a single step by feeding the oyster juice concentrate to a fluidized lactose layer formed by hot air at the mixing ratio as specified above.

The powdery oyster juice composition thus obtained may be further mixed with an additional oyster juice concentrate and dried. By repeating this procedure once or several times, a composition having a high freshness-retaining effect per unit weight may be obtained.

The powdery oyster juice composition thus prepared has an excellent preservability, can be easily handled in use since it is in the form of a powder, and is readily soluble in water.

According to the present invention, the freshness of perishable foods may be retained by contacting the foods, either before or after refrigeration or cold storage, with a powdery oyster juice composition or an aqueous solution thereof. The contact may be effected by, for example, immersing the food in an aqueous solution of the powdery oyster juice composition for a given period of time, spraying an aqueous solution of the powdery oyster juice composition to the food, or dusting the powdery oyster juice composition onto the food. It is also effective to contact the perishable food with the powdery oyster juice composition or an aqueous solution thereof both before and after refrigeration or cold storage.

When the powdery oyster juice composition is to be used in the form of an aqueous solution, the concentration thereof may be preferably 1% or above, still preferably 3% or above. It is also possible to use a suspension of the powdery oyster juice composition in water. The aqueous solution of the powdery oyster juice composition may further contain other components such as common salt, if required. When a perishable food is to be immersed in the aqueous solution of the powdery oyster juice composition, the immersion time may range from approximately 5 to 30 minutes, though it may vary depending on the type and size of the food. The immersion temperature may be appropriately selected. It is further effective to thaw a frozen perishable food while immersing it in the above-mentioned aqueous solution.

Perishable foods (for example, fish, shellfish, or livestock meats) treated according to the present invention scarcely cause dripping and are substantially free from fishery smell. They have tight and elastic textures comparable to unfrozen ones. When cooked by heating, they undergo little shrinkage like the unfrozen ones and are juicy. These facts are highly effective not only in improving the taste and palatability but also in increasing the yield of the product.

To further illustrate a process for the production of the powdery oyster juice composition of the present invention and a process for retaining the freshness of perishable foods with the use of said powdery oyster juice composition, the following examples will be given.

EXAMPLE 1

10 kg of lactose monohydrate was fed into a kneader and 1 kg of an oyster juice concentrate of 28° Bé was added thereto under stirring. When a homogenous mixture was obtained, the mixture was taken out of the kneader and spread on a drying pan. Then it was dried with a hot-air dryer at 75° C. for 50 minutes. The whole material thus dried was then fed into the kneader again and 1 kg of the oyster juice concentrate of 28° Bé was further added thereto under stirring. The above-mentioned hot-air drying was repeated and the whole material thus dried was fed into the kneader once again. Next, 0.8 kg of the oyster juice concentrate of 28° Bé was added thereto under stirring. After repeating the above-mentioned hot-air drying at 75° C. for 1 hour and 10 minutes, 8.7 kg a powdery oyster juice composition containing 2% of moisture and 0.5% of nitrogen was obtained.

EXAMPLE 2

15 head-less prawns occurring in China were immersed in an aqueous solution of 10 g of the powdery oyster juice composition produced in Example 1 and 15 of common salt in 500 ml of water at 23° C. for 20 minutes. After draining, the prawns were rapidly chilled at −37° C. The chilled prawns were stored in a freezer for 37 days and then thawed at 0° C. (sample of test lot).

As a control, 15 head-less prawns occurring in China were rapidly chilled at −37° C. immediately. After storing in a freezer for 37 days, the prawns were thawed at 0° C. (samples of control lot).

The following Table shows the comparison of the samples of the test lot with those of the control lot.

|  | Test lot | Control lot |
| --- | --- | --- |
| Yield (%)* | 99 | 96 |
| Elasticity after thawing | yes | little |

Note:
*Yield (%) = (weight after thawing/weight thawing) × 100

Further, the samples of the test and control lots were prepared into sashimi and taken by 10 panelists so as to conduct a triangle difference test (organoleptic evaluation; cf. note 1).

| No. of panelists giving correct answer | No. of panelists preferring test sample | No. of panelists preferring control sample |
| --- | --- | --- |
| 10 | 10 (cf. note 2) | 0 |

Note
1: This test comprises arbitrarily combining one or two samples of the test lot (A) with two or one sample of the control lot (B) to thereby give combinations of three samples, for example, (A-A-A, A-B-B), giving the samples to the panelists, and counting the panelists who correctly selected two samples from the same lot and one from another lot. Among these panelists giving the correct answers, those preferring samples of each lot were counted.
2: Reason for the preference: (1) the sample has taste and palatability similar to those of fresh prawns; (2) the sample gives no fishery smell.

The above test has proved that the prawns treated in accordance with the present invention are much superior to the untreated ones in, for example, yield and preference.

EXAMPLE 3

The adductor muscles of living scallops were immersed in an aqueous solution of 10 g of the powdery oyster juice composition produced in Example 1 and 10 g of common salt in 500 ml of water at 27° C. for 20 minutes. After draining, they were rapidly chilled at −37° C. After storing in a freezer for 48 days, the muscles were taken out and thawed (samples of test lot).

As a control, the adductor muscles of scallops were similarly taken out and rapidly chilled at −37° C. immediately. After storing in a freezer for 48 days, they were taken out and thawed (samples of control lot).

The following Table shows the comparison of the samples of the test lot with those of the control lot.

|  | Test lot | Control lot |
| --- | --- | --- |
| Yield (%)* | 100 | 99 |
| Elasticity after thawing | comparable to fresh one | soft and less elastic |
| Fishery smell | little | serious |
| Shrinkage upon roasting on iron plate (%)** | 90 | 70 |

*Yield (%) = (weight after thawing/weight before thawing) × 100
**Shrinkage (%) = (diameter of roasted muscle/diameter of unroasted muscle) × 100 (average of 10 samples). A Teflon-coated iron plate was used at a surface temperature of 180° C.

Furthermore, samples of the test lot and those of the control lots were roasted on the iron plate and taken by 10 panelists so as to conduct a triangle difference test (organoleptic evaluation).

| No. of panelists giving correct answer | No. of panelists preferring test sample | No. of panelists preferring control sample |
| --- | --- | --- |
| 10 | 10 (cf. note 2) | 0 |

Note
2: Reason for the preference: (1) the sample has taste and palatability similar to those of roasted fresh scallop adductor muscles; (2) the sample is juicy.

The above test has proved that the scallop adductor muscles treated in accordance with the present invention are much superior to the untreated ones in, for example, yield and preference.

EXAMPLE 4

20 eels split alive were divided into two groups each consisting of 10 fish. The eels of one group were rapidly chilled at −37° C. immediately (control lot). On the other hand, the eels of another group were immersed in an aqueous solution of 20 g of the powdery oyster juice composition produced in Example 1 and 60 g of common salt in 2000 ml of water at 26° C. for 30 minutes and then rapidly chilled at −37° C. (test lot). After storing in a freezer for 1 week, the eels were taken out and thawed in another freezer at 0° C. The thawed eels were steamed for 5 minutes and then roasted in an electric heater while applying a marketed tare (seasoning sauce) to thereby prepare kabayaki. The following table shows the yield in each step and the organoleptic evaluation.

|  | Yield in control lot | Yield in test lot |
| --- | --- | --- |
| Freezing/thawing | 96.4% | 97.1% |
| Thawing/steaming | 88.5% | 91.9% |
| Steaming/roasting, | 71.6% | 75.1% |

-continued

|  | Yield in control lot | Yield in test lot |
| --- | --- | --- |
| seasoning |  |  |

Further, these kabayaki products were taken by 10 housewives. As a result, all of them answered that those of the test lot were easy to take, since they were swollen, voluminous and freed from persistent smell.

EXAMPLE 5

5 raw horse mackerels were sliced in three layers and one of the fillets of each fish was immersed in an aqueous solution of 20 g of the powdery oyster juice composition produced in Example 1 and 70 g of common salt in 1000 ml of water at 24° C. for 1 hour and 30 minutes. After draining, these fillets were rapidly chilled at −37° C. After storing in a freezer for 1 day, they were taken out and spontaneously thawed (samples of test lot).

As a control, another fillet of each fish was immersed in an aqueous solution of 70 g of common salt in 1000 ml of water at 24° C. for 1 hour and 30 minutes. After draining, these fillets were rapidly chilled at −37° C. After storing in a freezer for 1 day, they were taken out and spontaneously thawed (samples of control lot).

The samples of the test and control lots were evaluated as follows.

Evaluation in Untreated State

The samples of the control lot were glossy but not transparent, whereas those of the test lot were glossy and transparent, thus giving a freshness.

Compared with the samples of the control lot, those of the test lot were voluminous and had high elasticity.

Although both of the samples of the test and control lots had a fishery smell, no offensive odor was noticeable.

Evaluation in Roasted State

During the roasting procedure, the samples of the test lot looked oily compared with those of the control lot. The former could be roasted within a shorter period and the whole fillets showed a well roasted color.

The samples of the test lot had a nice roasted smell without any offensive odor as compared with those of the control lot. Further, the former had a sweet taste and gave an impact when taken mouthful.

EXAMPLE 6

Lettuce leaves were divided into 3 groups. The first group was allowed to stand at room temperature (control lot); the second group was allowed to stand at room temperature after water spraying (water-treated lot); and the third group was allowed to stand at room temperature after being sprayed with an aqueous solution of 2 g of the powdery oyster juice composition produced in Example 1 in 100 ml of water (test lot). The following table shows changes in the weight and appearance of these lettuce leaves after one and two days.

|  |  | Control lot | Water-treated lot | Test lot |
| --- | --- | --- | --- | --- |
| Leaf weight (g) after | 1 day | 224 | 174 | 169 |
|  | 2 days | 207 | 260 | 256 |
| Tension after | 1 day | no | yes | yes |
|  | 2 days | no | no | yes |
| Gloss after | 1 day | no | no | yes |

|        | Control lot | Water-treated lot | Test lot |
|--------|-------------|-------------------|----------|
| 2 days | no          | no                | yes      |

According to the present invention, as described above, a powdery oyster juice composition which is effective in retaining the freshness of perishable foods can be obtained. In addition, said powdery oyster juice composition is excellent in preservability and can be easily handled.

When a frozen perishable food which has been treated with said powdery oyster juice composition is thawed, the food shows a freshness nearly comparable to that before freezing. When a cold-stored perishable food which has been treated with said powdery oyster juice composition is brought to room temperature, the food showed a freshness nearly comparable to that before cold storage.

I claim:

1. A process for retaining the freshness of a perishable food, comprising contacting a perishable food with an oyster juice composition comprising oyster juice and lactose wherein the oyster juice composition contains a weight ratio of oyster juice to lactose of at least 0.05:1.

2. A process as defined by claim 1, wherein the oyster juice composition is in powder form.

3. A process as defined by claim 1, wherein the oyster juice composition includes water.

4. A process as defined by claim 1, wherein the perishable food is contacted with the oyster juice composition prior to refrigeration of the perishable food.

5. A process as defined by claim 1, wherein the perishable food is contacted with the oyster juice composition subsequent to refrigeration of the perishable food.

6. A process as defined by claim 1, wherein the perishable food is contacted with the oyster juice composition prior to cold storage of the perishable food.

7. A process as defined by claim 1, wherein the perishable food is contacted with the oyster juice composition subsequent to cold storage of the perishable food.

8. A process as defined by claim 1, wherein the oyster juice composition is prepared by steaming oysters in the shell, drying the same and collecting drippings therefrom to obtain oyster juice, mixing the oyster juice with lactose, and drying the resulting mixture to reduce the moisture content of the mixture to 5% or less.

9. A process as defined by claim 8, wherein the drippings are filtered and concentrated to at least 28° Bé.

10. A process as defined by claim 8, wherein the oyster juice composition is in powder form.

11. A process as defined by claim 8, wherein the oyster juice composition further includes water.

12. A process as defined by claim 8, wherein the lactose comprises lactose monohydrate.

13. A process as defined by claim 12, wherein the weight ratio of oyster juice to lactose monohydrate is 0.05:1 to 0.1:1.

14. A process as defined by claim 1, wherein the lactose comprises lactose anhydride.

15. A process as defined by claim 14, wherein the weight ratio of oyster juice to lactose anhydride is 0.05:1 to 0.15:1.

* * * * *